(12) United States Patent
Conrad et al.

(10) Patent No.: US 6,922,600 B1
(45) Date of Patent: Jul. 26, 2005

(54) SYSTEM AND METHOD FOR OPTIMIZING MANUFACTURING PROCESSES USING REAL TIME PARTITIONED PROCESS CAPABILITY ANALYSIS

(75) Inventors: Edward W. Conrad, Jeffersonville, VT (US); Craig E. Schneider, Underhill, VT (US); John S. Smyth, Milton, VT (US); Daniel B. Sullivan, Milton, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/709,312

(22) Filed: Apr. 28, 2004

(51) Int. Cl.[7] .............................................. G06F 19/00
(52) U.S. Cl. ........................ 700/108; 700/51; 700/121; 702/83; 702/84
(58) Field of Search ................................. 700/9, 28–30, 700/32, 33, 36, 47, 49, 51, 97, 99, 108, 121, 171, 173, 174, 179; 702/80–84

(56) References Cited

U.S. PATENT DOCUMENTS

| | | | | |
|---|---|---|---|---|
| 4,320,463 | A | * 3/1982 | Himmelstein | ................. 702/84 |
| 5,339,257 | A | * 8/1994 | Layden et al. | ................. 702/84 |
| 5,355,951 | A | 10/1994 | Allen et al. | |
| 5,764,543 | A | 6/1998 | Kennedy | |
| 5,845,237 | A | * 12/1998 | Puel et al. | ................... 702/179 |
| 6,055,463 | A | * 4/2000 | Cheong et al. | ............. 700/223 |
| 6,148,268 | A | * 11/2000 | Wu et al. | ...................... 702/84 |
| 6,243,615 | B1 | 6/2001 | Neway et al. | |
| 6,442,496 | B1 | 8/2002 | Pasadyn et al. | |
| 6,463,345 | B1 | 10/2002 | Peachey-Kountz et al. | |
| 6,535,776 | B1 | * 3/2003 | Tobin et al. | ................. 700/110 |
| 6,584,370 | B2 | 6/2003 | Denton et al. | |
| 6,631,305 | B2 | * 10/2003 | Newmark | ................... 700/110 |
| 6,633,788 | B1 | 10/2003 | Riley et al. | |
| 6,671,570 | B2 | 12/2003 | Schulze | |
| 6,684,177 | B2 | * 1/2004 | Mishra et al. | .............. 702/179 |
| 6,789,031 | B2 | * 9/2004 | Wang | ........................ 702/81 |
| 2002/0026257 | A1 | 2/2002 | Newmark | |
| 2002/0193899 | A1 | 12/2002 | Shanmugasundram et al. | |
| 2003/0114948 | A1 | 6/2003 | Hellemann et al. | |
| 2003/0163212 | A1 | 8/2003 | Smith et al. | |
| 2003/0213613 | A1 | 11/2003 | Strozewski et al. | |
| 2004/0093107 | A1 | * 5/2004 | Good et al. | ................. 700/108 |

OTHER PUBLICATIONS

Merriam–Webster's Collegiate Dictionary, 1998, Merriam--Webster, Inc. 10th edition, p. 293.*

* cited by examiner

Primary Examiner—Leo Picard
Assistant Examiner—Sean Shechtman
(74) Attorney, Agent, or Firm—Anthony J. Canale; Hoffman, Warnick & D'Alessandro LLC

(57) ABSTRACT

A system and method for optimizing a manufacturing process. The system comprises: a database of operational data gathered from previously performed manufacturing processes; a filtering system for filtering the database into a plurality of data subsets; a calculation system for calculating evaluation criteria for a selected data subset; an analysis system for determining if the evaluation criteria meets a set of predetermined requirements; and an iteration system that selects a new data subset if the selected data subset fails to provide evaluation criteria that meets the set of predetermined requirements.

29 Claims, 4 Drawing Sheets

| Tech/Level | | | | WPN/Level | | | |
|---|---|---|---|---|---|---|---|
| CSOI9S2 | NR | | | 0000070P8959 | | NR | |
| n: | 204.00 | | | n: | 81.00 | | |
| csk: | 0.91 | csk,l: | 0.81 | csk: | 0.94 | csk,l: | 0.77 |
| Normal: | No | | | Normal: | Yes | | |
| W: | 0.98 | PW: | 0.00 | W: | 0.98 | PW: | 0.17 |
| Spec: | 75.00 | LogSpec: | 4.32 | Spec: | 75.00 | LogSpec: | 4.32 |
| ** | | | | ** | | | |
| ******************** | | | | ****** | | | |
| ********************************* | | | | ******************* | | | |
| ********************************************* | | | | ********************* | | | |
| ************************************************** | | | | ***************** | | | |
| ********************* | | | | ************** | | | |
| *************************** | | | | *** | | | |
| *************** | | | | * | | | |
| ******* | | | | | | | |
| ** | | | | * | | | |
| ** | | | | | | | |
| Tech/Level/Tool | | | | WPN/Level/Tool | | | |
| CSOI9S2 | NR | X52V | | 0000070P8959 | | NR | X52V |
| n: | 109.00 | | | n: | 45.00 | | |
| csk: | 1.32 | csk,l: | 1.13 | csk: | 1.35 | csk,l: | 1.05 |
| Normal: | No | | | Normal: | Yes | | |
| W: | 0.97 | PW: | 0.01 | W: | 0.98 | PW: | 0.77 |
| Spec: | 75.00 | LogSpec: | 4.32 | Spec: | 75.00 | LogSpec: | 4.32 |
| **** | | | | *** | | | |
| ********************** | | | | ********* | | | |
| ********************** | | | | *************** | | | |
| ************************** | | | | ********** | | | |
| ********************* | | | | ***** | | | |
| ****** | | | | *** | | | |
| ********* | | | | | | | |
| ** | | | | | | | |
| * | | | | | | | |

FIG. 3

SYSTEM AND METHOD FOR OPTIMIZING MANUFACTURING PROCESSES USING REAL TIME PARTITIONED PROCESS CAPABILITY ANALYSIS

BACKGROUND OF INVENTION

1. Technical Field

The present invention relates generally to manufacturing processes, and more specifically relates to a system and method for optimizing a manufacturing process using partitioned process capability analysis.

2. Related Art

In complex manufacturing environments, such as semiconductor processing, it is often difficult to quantify the true capability of manufacturing processes or tools on a real time basis. Thus, it is often difficult to prospectively evaluate the efficacy of using a process or tool in a given way. For instance, in a semiconductor fabrication process, it is often desirable to take sample measurements (i.e., metrology sampling) from a "lot" of wafers when measuring overlay and the like to ensure high performance. A typical lot comprises about 20 silicon wafers. However, metrology adds a significant cost to the overall process. Accordingly, to the extent "skip lot sampling" can be implemented to eliminate metrology sampling, the cost of the overall fabrication process can be lowered. Other aspects of wafer processing include the requirement to select a tool to deploy product for the particular operation. Determining which tool will provide the best balance of performance and cost effectiveness is critical in achieving overall manufacturing efficiencies.

Existing techniques for analyzing capability generally involve reviewing data collected from previous manufacturing operations. Statistical Process Control (SPC) is often used as the mechanism for monitoring changes in capability. However, techniques such as SPC generate prohibitively large amounts of data. The volume of data results in slow reactions to change, and is difficult to use for troubleshooting. Often, the SPC charts do not provide a detailed understanding of the interactions inherent in the process controls.

For instance, skip lot sampling plans, which dictate when the metrology step can be skipped for a specific lot, are often determined based on process capability analysis (Cpk) calculations of very broadly generalized datasets such as technology and level combinations. Unfortunately, such calculations are typically made on an infrequent basis and are typically not revisited for significant periods of time. Thus, the capability analysis reacts very slowly, or not at all, to performance improvements or degradations. Capability analysis systems are, for example, described in U.S. Patent Application U.S. 2002/0026257 A1, published on Feb. 28, 2002 by Newmark, entitled "Capability Analysis of Assembly Line Production," which is hereby incorporated by reference.

Moreover, due to the need to simplify SPC charting, data related to many technologies and levels are often combined in the same analysis. Capability analysis of the combined data hides the individual capabilities of specific tools, reticles, part numbers, etc., and results in missed optimizations. For instance, a targeted subset of the data may indicate a low risk opportunity to skip metrology for a lot of wafers under a given set of circumstances, which may be missed since the data could only be analyzed at a very high level. Similar misleading results could also impact tool deployment, which is historically based on a tool capability analysis

SUMMARY OF INVENTION

The present invention addresses the above-mentioned problems, as well as others, by providing a system and method for optimizing a manufacturing process. In a first aspect, the invention provides a method of processing a workpiece, comprising: providing a database that can be filtered into subgroups of operational data gathered from previously processed workpieces; calculating evaluation criteria for a selected subgroup of operational data; determining whether the evaluation criteria satisfy predetermined requirements; if the evaluation criteria satisfy the predetermined requirements, processing the workpiece using a process condition determined by the selected subgroup of operational data; and if the evaluation criteria do not satisfy the predetermined requirements, repeating the method with a different selected subgroup of operational data.

In a second aspect, the invention provides a system for optimizing a manufacturing process, comprising: a database of operational data gathered from previously performed manufacturing processes; a filtering system for filtering the database into a data subset; a calculation system for calculating evaluation criteria for the data subset; an iteration system that causes the filtering and calculation systems to be rerun for a different data subset; and a system for determining operating conditions of the manufacturing process based on the calculated evaluation criteria.

In a third aspect, the invention provides a program product stored on a recordable medium for optimizing a manufacturing process, comprising: means for filtering a database of operational data gathered from previously performed manufacturing processes into a plurality of data subsets; means for calculating evaluation criteria for a selected data subset; means for determining if the evaluation criteria meet a set of predetermined requirements; and means for repeating the calculating and determining processes for a new data subset if the selected data subset fails to provide evaluation criteria that meet the set of predetermined requirements.

In a fourth aspect, the invention provides a method of optimizing a manufacturing process, comprising: providing a database of operational data gathered from previously performed semiconductor fabrication processes; providing a set of filters that include operational parameters of the current metrology process; filtering the database with a selected filter to generate a data subset; calculating evaluation criteria for a selected data subset; iterating the filtering and calculating steps for different data subsets; and determining operating conditions of the manufacturing process based on the calculated evaluation criteria.

BRIEF DESCRIPTION OF DRAWINGS

These and other features of this invention will be more readily understood from the following detailed description of the various aspects of the invention taken in conjunction with the accompanying drawings in which:

FIG. 3 depicts four data subsets generated using four different filters for the skip lot sampling process of FIG. 2.

DETAILED DESCRIPTION

Figure 1:
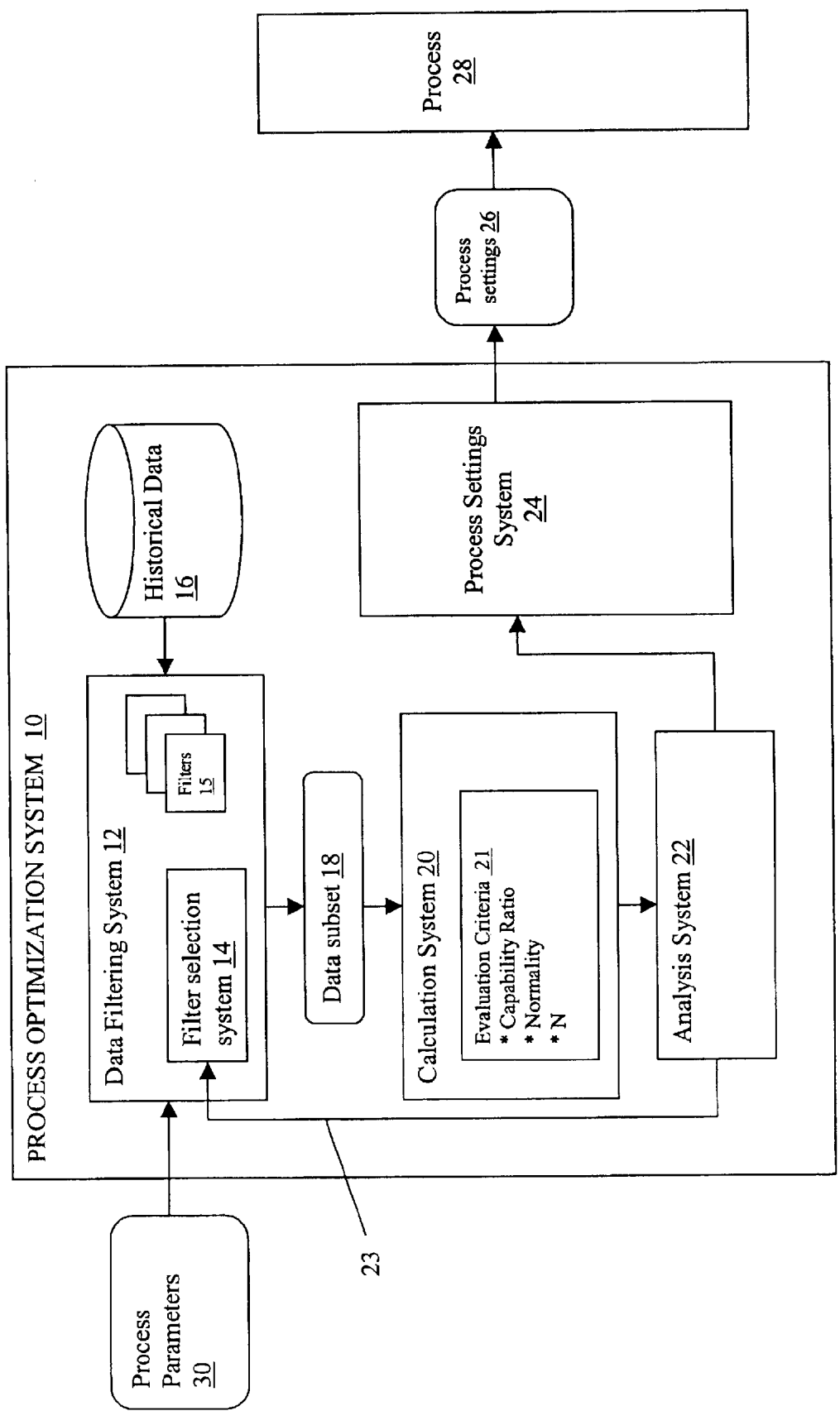
FIG. 1 depicts a process optimization system in accordance with the present invention.

Referring now to the drawings, FIG. 1 depicts a process optimization system 10 that receives as input a set of process parameters 30 and outputs process settings 26 in real time for use in a process 28. In two of the exemplary embodiments described herein, process 28 involves a semiconductor processing operation involving: (1) skip lot sample planning, i.e., determining whether a lot of wafers should be subjected to a costly metrology process; and (2) tool deployment, i.e., determining which tool should be deployed for a particular process step. However, it should be understood that the present invention could be applied to any manufacturing process in which a processing decision must be made, including, e.g., defect inspections, electrical testing, etc.

Process parameters 30 may comprise any parameters or operational conditions that describe the nature of the manufacturing process to be performed. For instance, parameters 30 may include: a semiconductor technology, an operation to be performed, the tool to be used, tool settings, lot size, part numbers, etc. Process settings 26 may include any setting or operational condition that process 28 can use to optimize operations of process 28. For example, process settings 26 may include a finding that skip lot processing should be implemented, or that it makes sense to use a low efficiency tool.

Process optimization system 10 operates by analyzing historical data 16, which comprises a database of operational data from prior processing operations, to determine if an optimization is warranted for a given set of input parameters 30. Historical data 16 may include any type of relevant operational data that describes both the nature of the operation and the results. For example, historical data may include performance data for given operations using different operational parameters and conditions. The data may be stored in any manner, e.g., in one or more databases, distributed over a network, in a flat file, in RAM or ROM, etc.

Process optimization system 10 includes a data filtering system 12 that utilizes a set of filters 15 to identify subsets of data from historical data 16 that match one or more inputted process parameters 30. For instance, if the inputted process parameters 30 indicated that process 28 involved technology A, part number B, using tool C, then data filtering system 12 would search historical data 16 to identify data from past operations with the same (or similar) process parameters. For instance, possible data sub-sets could be generated by filtering on A, AB, ABC, AC, BC or just C.

Filter selection system 14 also provides a mechanism for managing and selecting the filters 15. The set of available filters 15 may be predetermined, or could be dynamically generated based on the input process parameters 30. Note that there are no limitations on the number or types of the filters 15, e.g., they could be hierarchical or non-hierarchical. Filter selection system 14 selects and implements filters 15 one at a time to generate unique subsets of data. Any mechanism can be used to implement the filters, e.g., a relational database, etc. Each time a new data subset 18 is generated, it is evaluated using the process described below. The filter selection process can be implemented in any manner, e.g., from broad to narrow, narrow to broad, etc.

After an initial filter is selected, a data subset 18 will be generated, which includes operational data for all previous processes stored in historical data 16 that met the filtering criteria. In general, the broader the filter, the more results in the data subset 18. After the data subset 18 is generated, it is passed to a calculation system 20 that calculates one or more evaluation criteria 21 that measure the efficacy of a proposed optimization under the given conditions (e.g., should skip lot sampling be implemented for technology A using tool B). Illustrative evaluation criteria include a process capability ratio (Cpk), a normality curve or hypothesis, and a value N indicating a sample size. Obviously, the specific types of evaluation criteria used may vary and can depend on the particular process 28 being optimized.

In one possible embodiment, once the various evaluation criteria 21 are calculated, they may be passed to requirement analysis system 22 to determine if criteria 21 meet a minimum threshold. Specifically, each criterion is compared or evaluated against a predetermined requirement to determine if the calculated evaluation criteria 21 are acceptable. For instance, if the process capability ratio Cpk meets a predetermined threshold "and" the normality curve meets a hypothetical requirement "and" N is greater than a minimum sample size, then the evaluation criteria 21 would be deemed acceptable by requirement analysis system 22.

If the evaluation criteria 21 are acceptable, then the optimization can be implemented using conditions or settings determined from the selected filter and/or data subset 18. Alternatively, iteration system 23 may be implemented to repeat the filtering 12/calculation 20/requirement analysis 22 processes to evaluate other possible filter selections and data subsets 18. In this case, multiple different possible optimization configurations that meet the necessary requirements could be collected and passed on to a process settings system 24 or process 28 for further evaluation. When an acceptable evaluation criteria 21 is determined, process settings system 24 is used to transform the, related evaluation criteria, filter parameters, historical data, etc., into set points or other values that can be used by process 28.

In either case, if the evaluation criteria 21 was not acceptable, then (in a similar fashion to that just described) iteration system 23 would pass control back to filter selection system 14, which would determine if there are any other filters that have not been selected. If other filters exist, then: (1) data filtering system 12 selects a new filter and uses the new filter to generate an updated data subset 18; (2) calculation system 20 recalculates the evaluation criteria 21; and (3) analysis system 22 rechecks to see if the recalculated evaluation criteria 21 is acceptable.

In an embodiment wherein the first available optimization is sought, the filtering 12/calculation 20/requirement analysis 22 processes will continue to iterate until either all possible filters have been exhausted or until a set of evaluation criteria 21 is deemed acceptable by requirement analysis system 22. In this embodiment, if the evaluation criteria 21 for any filter selection are found to be acceptable, then the optimization can be implemented. If however, the evaluation criteria fail for each possible filter 15, then process settings system 24 could use default, or un-optimized output process settings.

In the case where multiple possible optimizations are sought, the filtering 12/calculation 20/requirement analysis 22 processes will continue to iterate until all possible filters have been exhausted. In one variation to this embodiment, requirement analysis system 22 could be eliminated altogether, allowing all possible optimization configurations to be collected, regardless of whether they met a minimum standard.

Figure 2:
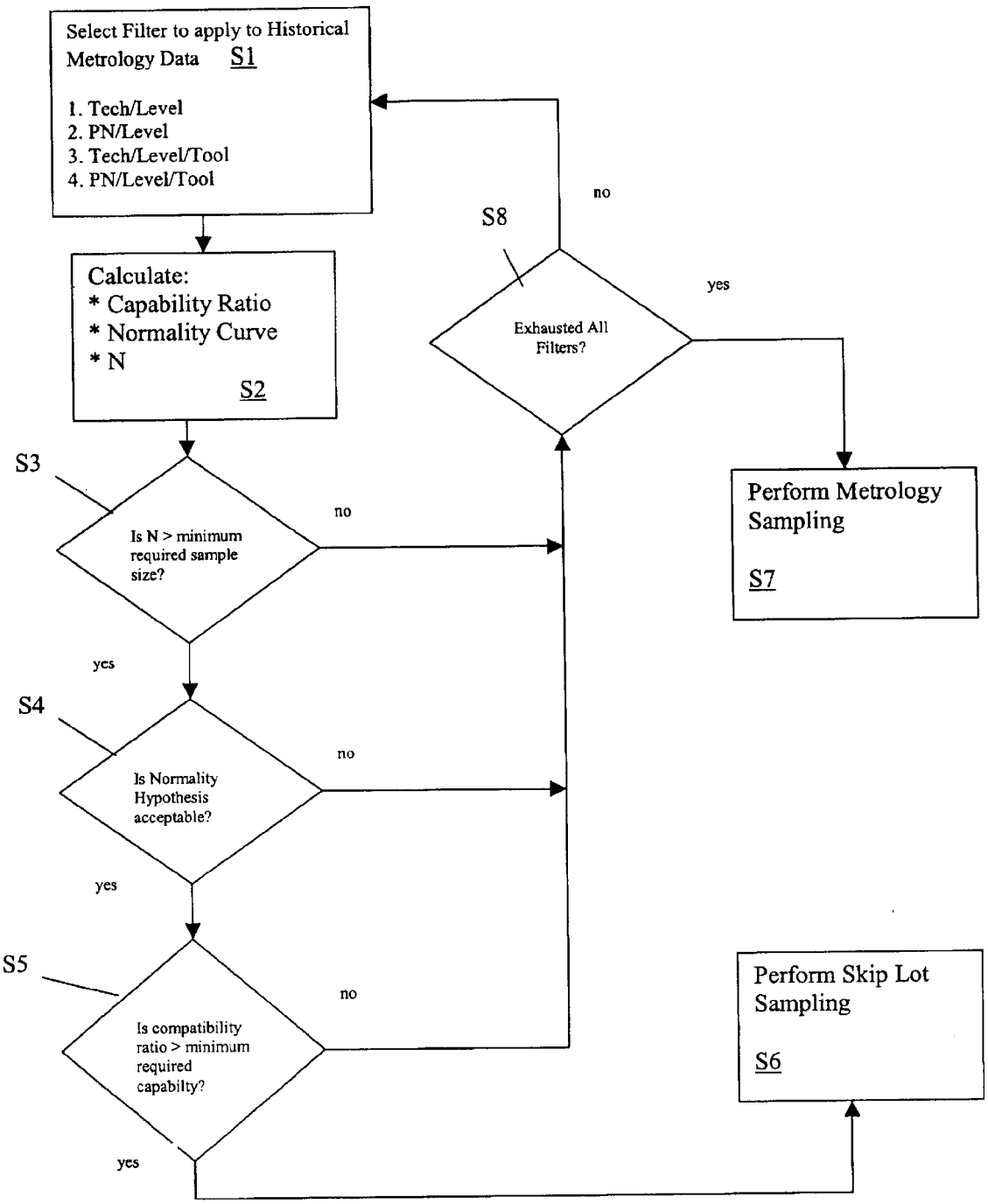
FIG. 2 depicts a flow diagram of an optimization process involving skip lot sampling.

Referring now to FIG. 2, a flow diagram of an optimization process involving skip lot sampling is shown. At the first step S1, a filter is selected, which is applied to a database of historical metrology data. In this case, four possible filters are available, (1) Technology/Level, (2) Part Number(PN)/Level, (3) Technology/Level/Tool, and (4) PN/

Level/Tool. Depending on which filter is selected, a unique subset of metrology data is generated.

At step S2, a set of evaluation criteria is calculated from the data subset. In this case, a capability ratio, a normality curve, and a minimum sample size (N) is calculated.

At step S3, a first test occurs to determine if N is greater than a minimum required sample size. The minimum required sample size could be selected in any manner, e.g., it could be preset based on experiences of the users. If N is greater than the minimum sample size, a second test occurs at step S4, which determines whether the normality curve (or hypothesis) is acceptable. Deviations from a standard normal distribution can be readily detected in any manner. Depending on what criteria are used to determine the historical data set, it is possible to find bimodal and non-normal distributions which give adequate capability ratio values, but which have significant tails, i.e., spikes outside the normal distribution curve. In these situations, if the lots in the tail of the distribution share a common factor (e.g., broken tool, degraded process, etc.), a small sample of the lots available for skipping could experience the vast majority of the risk. If all lots in the sample set used the sample skip rules, the subset in the tail runs a significant chance of being shipped "out of spec" without being measured.

If the normality hypothesis is met, then a third test occurs at step S5, which determines whether the capability ratio is greater than a minimum required value. The capability ratio may comprise any type of capability analysis, as is known in the art. Possible capability ratios may for instance include, a classical process capability ratio Cpk, a sampling capability ratio, etc. In one exemplary embodiment, the capability ratio comprises a confidence interval ($C_{sk,l}$) calculated as follows:

$$C_{sk,l} = C_{sk} \cdot \left[ 1 - Z_{m/2} \cdot \sqrt{\frac{1}{9 \cdot n \cdot C_{sk}^2} + \frac{1}{2 \cdot (n-1)}} \right]$$

where Z is a score, and a sampling capability ratio $C_{sk}$ is given by:

$$C_{sk} = \frac{USL - \overline{X}}{3.0 \cdot S}$$

and USL is an upper specification limit and where S is a sample standard deviation given by:

$$S = \sqrt{\frac{\sum_{i=1}^{a} (X_i - \overline{X})^2}{n}}$$

and where the sample mean is determined by averaging data points $X_i$ as follows:

$$\overline{X} = \frac{\sum_{i=1}^{a} X_i}{n}$$

If the capability ratio is greater than the minimum required, then skip lot sampling is performed at step S6.

If any one of the tests fails at steps S3–S5, then the process is passed to step S8, which determines whether all of the filters have been exhausted. If all of the filters have not been exhausted, then control is passed back to step S1. At this point, a new filter is selected, and steps S2–S5 are repeated to determine if the recalculated evaluation criteria for the new filter is acceptable. The process is repeated until either: (1) acceptable evaluation criteria are obtained; or (2) all the filters are exhausted at step S8 (i.e., none of the filters yield acceptable evaluation criteria). If all the filters are exhausted, then metrology is performed at step S7.

FIG. 3 depicts the calculated evaluation criteria for the four illustrative filters described in FIG. 2. Namely, the upper left hand quadrant depicts evaluation criteria for Technology/Level, the upper right hand quadrant depicts evaluation criteria for Part Number(WPN)/Level, the lower left hand quadrant depicts evaluation criteria for Technology/Level/Tool, and the lower right hand quadrant depicts evaluation criteria for WPN/Level/Tool. In this example, "csk,l" represents a capability ratio, "Normal" represents the normality hypothesis which is shown as a bar graph in each quadrant, and "n" represents the number of records or sample located for the particular filter. For this example, csk,l must be greater than 1.0, Normal must be "yes," and n must be greater than 12 for the criteria to be acceptable.

The upper left hand quadrant shows first filter results for technology CSO19S2 and level NR. As can be seen, n=204, csk,l=0.81 and Normal=no. Accordingly, for this Technology/Level filter selection, the calculated evaluation criteria would be unacceptable since csk,l was less than 1.0 and Normal=no. Thus, a next filter would be selected.

The upper right hand quadrant shows second filter results for Part Number 0000070P8959 and level NR, which is a subset of the data generated in the upper left hand quadrant. As can be seen, n=81, csk,l=0.77 and Normal=yes. Accordingly, for this WPN/Level filter selection, the calculated evaluation criteria would also be unacceptable since csk,l was less than 1.0. Thus, a next filter would be selected.

The lower left hand quadrant shows third filter results for technology CSO19S2, level NR, and Tool X52V, which is a different subset of the data generated in the upper left hand quadrant. As can be seen, n=109, csk,l=1.13 and Normal=no. Accordingly, for this Technology/Level/Tool filter selection, the calculated evaluation criteria would also be unacceptable since Normal=no. Thus, a next filter would be selected.

The lower right hand quadrant shows fourth filter results for Part Number 0000070P8959, level NR, and tool X52V, which is a subset of the data generated in each of the other three-quadrants. As can be seen, n=45, csk,l=1.05 and Normal=yes. Accordingly, for this WPN/Level/Tool filter selection, the calculated evaluation criteria would be acceptable since csk,l was greater than 1.0, n was greater than 12, and Normal=yes.

Thus, using these results, the optimization could be implemented in any desirable manner. For instance, skip lot sampling could be implemented using standard statistical techniques based on capability ratio value, e.g., 1:2, 1:4, 1:6, 1:8, wherein higher Cpk values result in fewer measurements.

Figure 4:
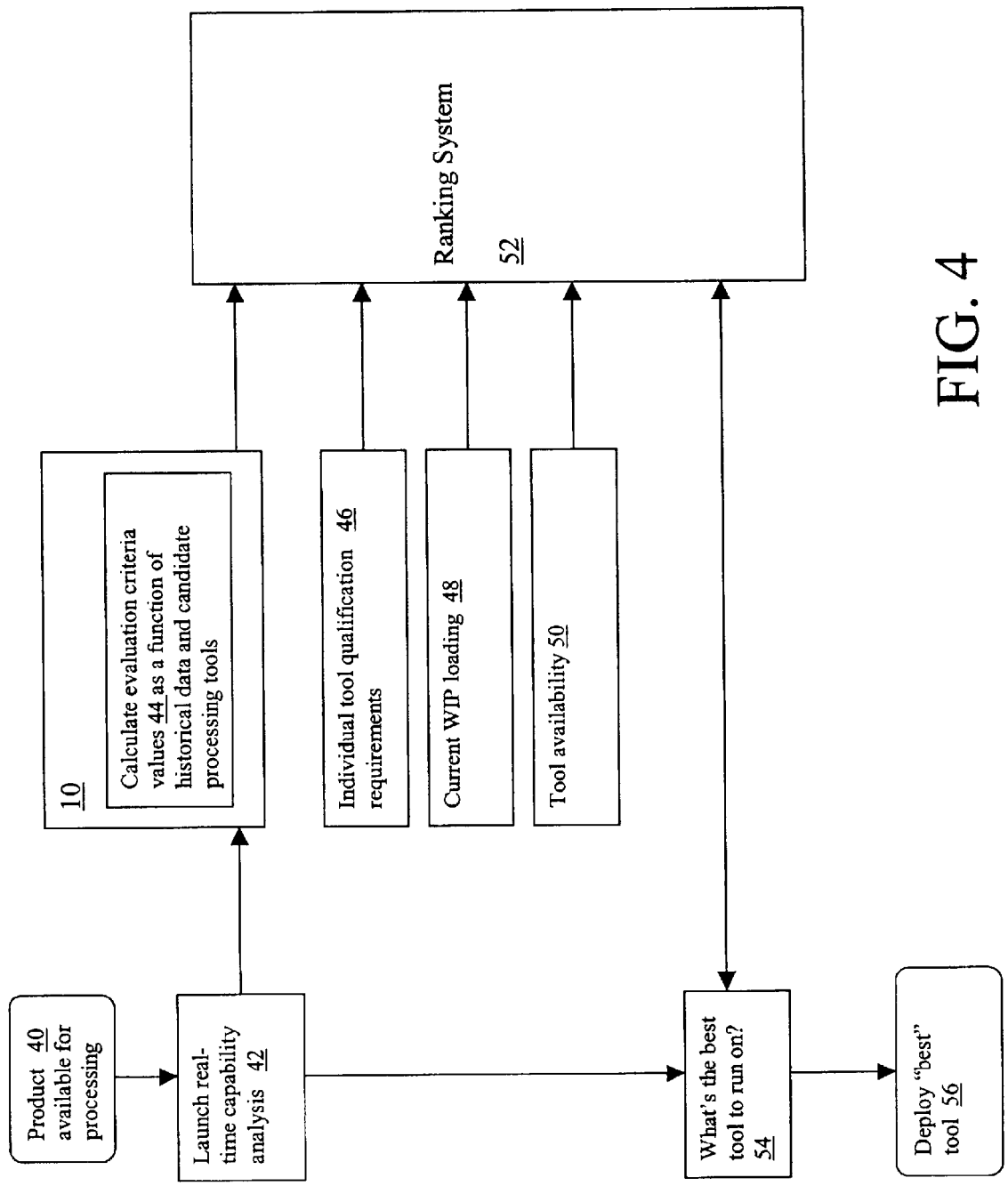
FIG. 4 depicts a flow diagram of a capability-based tool deployment system in accordance with the present invention.

Referring now to FIG. 4, a flow diagram depicting a capability-based tool deployment system is shown. In this embodiment, process optimization system 10 is utilized to help select the most efficient tool from a plurality of candidate tools to perform a particular function. In this embodiment, when a product 40 is available for processing, a real-time capability analysis 42 is launched to determine the best tool to process the product 40. Process optimization system 10 is utilized to calculate a set of evaluation criteria values 44 (e.g., Cpk and/or normality) for each candidate tool. In such an embodiment, data filtering system 12 described in FIG. 1 would identify all candidate combinations for deployment of a lot based upon industry standard tool qualification requirements. Each evaluation criteria value is then calculated as a function of a filtered subset of the historical data for the candidate tool, as described above. For instance, hypothetical Tool A might have filtered subsets "Tool A/Technology A/ Part A" and "Tool A/Part B," which have respective Cpk values of 0.95 and 0.80, and hypothetical Tool B might have filtered subsets "Tool B/Technology A/Part C" and "Tool B/Part B," which have respective Cpk values of 1.2 and 0.60.

Then, ranking system 52 would order the candidate tools by evaluation criteria values 44. Other factors used by ranking system 52 might include individual tool qualification requirements 46, current WIP (work in process)loading 48 for all tools, tool availability 50, etc. Realtime capability analysis could then query 54 the ranking system 52 to determine the best tool to deploy, which in turn would deploy the best tool 56.

Thus, as can been seen, by using this invention to partition historical data at different granularities and/or based on different input parameters, relevant operational data can be examined in real time from different perspectives to optimize a manufacturing process.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method of processing a workpiece, comprising:
   providing a historical database of operational data gathered from previously processed workpieces, wherein the operational data is unrelated to the processing of the workpiece and wherein the operational data can be filtered into subgroups of operational data;
   calculating evaluation criteria for a selected subgroup of operational data;
   determining whether the evaluation criteria satisfy predetermined requirements;
   if the evaluation criteria satisfy the predetermined requirements, processing the workpiece using a process condition determined by the selected subgroup of operational data; and
   if the evaluation criteria do not satisfy the predetermined requirements, repeating the method with a different selected subgroup of operational data.

2. The method of claim 1, wherein the step of processing the workpiece comprises measuring the workpiece at a measuring step.

3. The method of claim 1, wherein the step of processing the workpiece comprises not measuring the workpiece at a measuring step.

4. The method of claim 1, wherein the step of processing the workpiece comprises processing workpiece on a process tool having a predetermined process capability for the workpiece.

5. The method of claim 1, comprising the further step of using a default process condition if all of the subgroups of operational data have been exhausted.

6. The method of claim 1, wherein the evaluation criteria comprises a normality value and a capability value.

7. A system for optimizing a manufacturing process, comprising:
   a historical database of operational data gathered from previously performed manufacturing processes;
   a filtering system for filtering the historical database into a data subset;
   a calculation system for calculating evaluation criteria for the data subset;
   an iteration system that causes the filtering and calculation systems to be rerun for a different data subset; and
   a system for determining operating conditions of the manufacturing process based on the calculated evaluation criteria.

8. The system of claim 7, further comprising an analysis system for determining if the evaluation criteria meets a set of predetermined requirements.

9. The system of claim 8, wherein the iteration system is rerun if the selected data subset fails to provide evaluation criteria that meets the set of predetermined requirements.

10. The system of claim 7, wherein the evaluation criteria includes a capability ratio and a normality value.

11. The system of claim 10, wherein the evaluation criteria further comprises a sample size.

12. The system of claim 7, wherein the manufacturing process comprises a metrology operation for taking measurements of a semiconductor.

13. The system of claim 12, wherein the analysis system implements a skip lot sampling optimization if the evaluation criteria meet the set of predetermined requirements.

14. The system of claim 7, wherein the operating conditions comprise selecting a tool set to deploy for the manufacturing process.

15. The system of claim 7, wherein the filtering system includes a set of filters that filter on parameters that include: semiconductor technology and level; semiconductor part number and level; semiconductor technology, tool and level; and semiconductor part number, tool and level.

16. A program product stored on a recordable medium for optimizing a manufacturing process, comprising:
  means for filtering a historical database of operational data gathered from previously performed manufacturing processes into a plurality of data subsets;
  means for calculating evaluation criteria for a selected data subset;
  means for determining if the evaluation criteria meet a set of predetermined requirements; and
  means for repeating the calculating and determining processes for a new data subset if the selected data subset fails to provide evaluation criteria that meet the set of predetermined requirements.

17. The program product of claim 16, wherein the evaluation criteria includes a capability ratio and a normality value.

18. The program product of claim 17, wherein the evaluation criteria further comprises a sample size.

19. The program product of claim 16, wherein the manufacturing process comprises a metrology operation for taking measurements of a semiconductor.

20. The program product of claim 19, wherein the determining means implements a skip lot sampling optimization if the evaluation criteria meet the set of predetermined requirements.

21. The program product of claim 16, wherein the manufacturing process comprises selecting a tool for deployment.

22. The program product of claim 20, wherein the repeating means is repeated for each of a plurality of data subsets for each of a plurality of candidate tools.

23. The program product of claim 16, wherein the means for filtering includes a set of filters that filter on parameters that include: semiconductor technology and level; semiconductor part number and level; semiconductor technology, tool and level; and semiconductor part number, tool and level.

24. A method of optimizing a manufacturing process, comprising:
  providing a historical database of operational data gathered from previously performed manufacturing processes;
  providing a set of filters that include operational parameters of a current manufacturing process;
  filtering the historical database with a selected filter to generate a data subset;
  calculating evaluation criteria for a selected data subset;
  iterating the filtering and calculating steps for different data subsets; and
  determining operating conditions of the current manufacturing process based on the calculated evaluation criteria.

25. The method of claim 24, further comprising the step of, after the calculating step, determining if the evaluation criteria meets a set of predetermined requirements.

26. The method of claim 25, wherein the iterating steps includes selecting a new filter from the set of filters if the evaluation criteria fails to meet the set of predetermined requirements.

27. The method of claim 24, including the further step of using skip lot sampling if the evaluation criteria meet the set of predetermined requirements.

28. The method of claim 24, including the further step of implementing a metrology process if none of the set of filters provides evaluation criteria that meet the set of predetermined requirements.

29. The method of claim 24, wherein the evaluation criteria comprises a capability ratio and a normality value.

* * * * *

UNITED STATES PATENT AND TRADEMARK OFFICE
CERTIFICATE OF CORRECTION

PATENT NO. : 6,922,600 B1
DATED : July 26, 2005
INVENTOR(S) : Conrad et al.

It is certified that error appears in the above-identified patent and that said Letters Patent is hereby corrected as shown below:

Column 5,
Line 15, please insert -- a -- in the word "bimodal" between "bi" and "modal".

Column 6,
Line 47, please take out the "-" between the words "three" and "quadrants".

Column 7,
Line 16, please insert -- a -- in the word "Realtime" between "Real" and "time".
Line 31, please insert a -- - -- after the word "general".
Line 41, please insert a -- - -- after the word "system".

Signed and Sealed this

Eighteenth Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,922,600 B1 Page 1 of 1
APPLICATION NO. : 10/709312
DATED : July 26, 2005
INVENTOR(S) : Conrad et al.

It is certified that error appears in the above-identified patent and that said Letters Patent is hereby corrected as shown below:

<u>Column 5,</u>
Line 15, please insert -- - -- in word "bimodal" between "bi" and modl".

<u>Column 6,</u>
Line 47, please take out the "-" between the words "three" and "quadrants".

<u>Column 7,</u>
Line 16, please insert -- - -- in the word "Realtime" between "Real" and "time".
Line 31, please insert a -- - -- after the word "general".
Line 41, please insert a -- - -- after the word "system".

This certificate supersede certificate of correction issued October 18, 2005.

Signed and Sealed this

Twenty-second Day of August, 2006

JON W. DUDAS
*Director of the United States Patent and Trademark Office*